Figure 1:
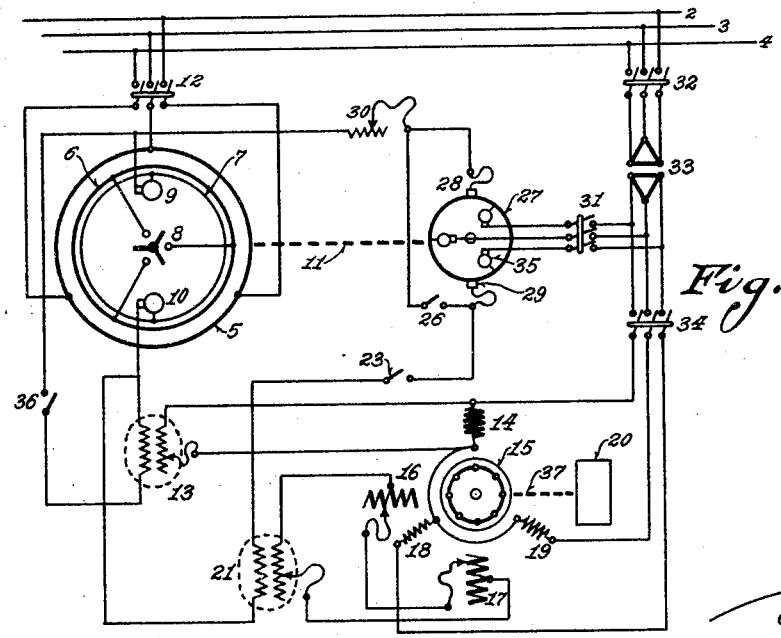

Nov. 26, 1929.  V. A. FYNN  1,737,009
DYNAMO ELECTRIC MACHINE
Filed Jan. 19, 1928

Inventor:
Valère A. Fynn

Patented Nov. 26, 1929

1,737,009

UNITED STATES PATENT OFFICE

VALÈRE A. FYNN, OF ST. LOUIS, MISSOURI; FRANKLIN-AMERICAN TRUST COMPANY ADMINISTRATOR OF SAID VALÈRE A. FYNN, DECEASED

DYNAMO-ELECTRIC MACHINE

Application filed January 19, 1928. Serial No. 247,945.

My invention relates to dynamo electric machines in which a more or less uniform revolving field is produced at starting and is particularly well adapted for use in non-synchronous motors during starting and in synchronous motors during starting and during synchronizing. In some of its aspects it is broadly applicable to single as well as to polyphase dynamo electric machines.

Although often very desirable, it is difficult to start an induction motor or a synchronous motor as an induction motor with a powerful torque when its secondary is closed along a single axis per pole pair. The total obtainable torque as well as the torque per ampere is low. On the other hand a synchronous motor can be synchronized under almost any conditions by simply injecting direct current into a suitable winding on its secondary provided this be done when the motor speed is very near the synchronous. In order to bring the speed close to synchronism under load, it is necessary to have means for producing a powerful induction motor torque at low slip speeds. One way of securing such an induction motor torque is to dispose on the secondary and in the best possible inductive relation to the primary, a preferably polyphase winding of low ohmic resistance. But such a winding produces not only a notoriously low torque per ampere but also a notoriously low total torque at starting and furthermore reduces the usefulness of the ordinary "exciting" winding as a starting winding. Some of the objects of my invention are to overcome these difficulties but the several features of this invention are not necessarily all used simultaneously, each is capable of independent use and is capable of individually improving the machine in which it is incorporated.

In one form of my invention as applied for instance to a polyphase synchronous motor, I dispose a polyphase, but not necessarily symmetrical polyphase, winding on the secondary in as close mechanical relation to the primary as mechanical considerations permit but without changing the reluctance of the magnetic circuit of the machine in so far as the exciting winding on the secondary is concerned. I achieve this by shortening the air-gap between primary and secondary as much as purely mechanical considerations will allow and introducing an auxiliary and suitably located air-gap into each magnetic circuit of the machine. I make the ohmic resistance of this polyphase winding very low and preferably leave it open at starting or close it over comparatively high resistances, so as not to materially or at all impair the usefulness of the exciting winding on the secondary as a starting torque producing winding, and make provision for shortcircuiting the said polyphase winding after the rotor speed has risen to a sufficient value. I further make provision for closing the exciting winding on the secondary at starting and for bringing the current generated in the so formed circuit preferably about into phase with the voltage primarily responsible for said current and generated in the exciting winding by the revolving flux of the machine. To this end I inject into the circuit of the exciting winding an auxiliary phase correcting voltage leading the generated voltage by about 90 degrees and of approximately the magnitude of the reactance voltage set up by the generated starting current in the exciting winding. I derive this auxiliary phase correcting voltage from the exciting winding itself, and preferably cause it to vary when the voltage generated in the exciting winding varies. Finally I make provision for injecting a synchronizing voltage into the exciting winding on the secondary. This synchronizing voltage may be unidirectional or of slip frequency and of an amplitude independent of its frequency.

In one way of operating my improved motor I start the machine by closing the circuit of the monoaxial "exciting" winding and neutralizing or compensating for at least part of the inductance of said winding. After the machine has reached a sufficient speed I shortcircuit the polyaxial winding on the secondary thus bringing the machine very close to synchronism and finally I inject a synchronizing voltage into a monoaxial winding on the secondary. When the current in the monoaxial winding lags 90 degrees behind the voltage generated in said winding the torque due to the monoaxial winding is a purely alternating torque of double slip frequency. Integrated over a complete line period it is zero and unable to start the motor. When the current in the monoaxial winding is in phase with the generated voltage the torque it produces is unidirectional and pulsating. This is the ideal condition in so far as starting torque is concerned and I inject the auxiliary phase correcting voltage in order to bring about or approach this condition and at least make the starting torque preponderantly positive.

The several objects and features of this invention will more clearly appear from the detail description taken in connection with the accompanying drawings and will be pointed out in the claims.

Figure 3:
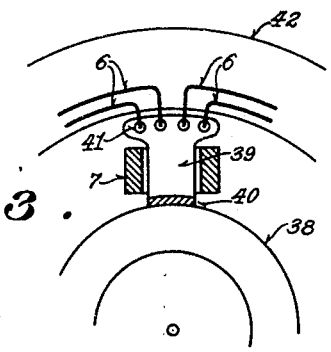
Figure 2:
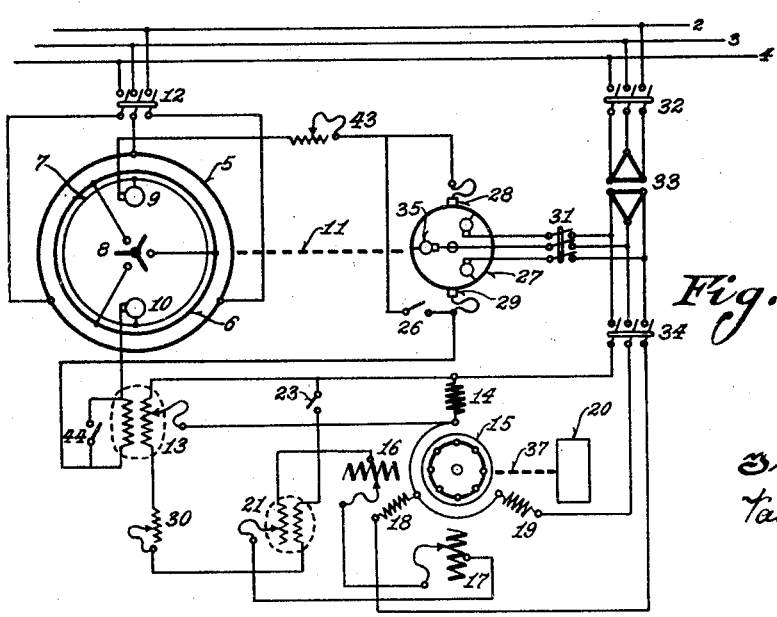

In the accompanying drawings Figs. 1 and 2 are diagrammatic representations of two embodiments of my invention as applied to two-pole polyphase synchronous motors and Fig. 3 is a diagrammatic illustration of one way of locating the windings and the auxiliary air-gap on the secondary of a synchronous motor with pronounced polar projections.

Referring to Fig. 1, the synchronous motor carries on its stator a primary three-phase winding 5 adapted for connection to the mains 2, 3, 4 by way of switch 12; on its rotor it carries a three-phase winding 6 adapted to be short-circuited in delta by means of switch 8, and a monoaxial winding 7 connected to the slip rings 9, 10. Mounted on the shaft 11 of the synchronous motor, or positively driven thereby, is a frequency converter the rotor of which carries the commuted winding 27 connected to the three-phase arrangement of sliprings 35 and adapted for connection to the mains 2, 3, 4 through said sliprings, switch 31, transformer 33 and switch 32. Adjustably located stationary brushes 28, 29 cooperate with 27. The phase converter 15 of the induction motor type comprises a motor winding 14 located on the stator and connected to the sliprings 9, 10 of the main motor through the adjustable ratio transformer 13 which can be disconnected from 7 by means of switch 36. It further comprises two stator generator windings 16, 17 the active turns of which can be varied, two stator starting windings 18, 19 and a squirrel cage winding on its rotor 15. The shaft 37 of this phase converter carries a heavy flywheel 20. The starting windings 18, 19 are so located with respect to 14 and so connected to it that the three windings 14, 18, 19 form a star connected three-phase starting winding adapted to be connected to the mains through switch 34, transformer 33 and switch 32. The generator windings 16, 17 are connected in series with each other and with the primary of the adjustable ratio transformer 21 the secondary of which is connected at one end to slipring 10 and at the other to switch 23. Brush 28 of the frequency converter is connected to slipring 9 through the adjustable resistance 30 and can be connector to brush 29 through switch 26. Brush 29 can be connected to slipring 10 through switch 23 and the secondary of transformer 21.

In the arrangement shown in Fig. 2 the frequency converter, which, as in Fig. 1, serves to produce a slip frequency synchronizing voltage at sub-synchronous speeds and the unidirectional voltage at synchronism, is in circuit with the sliprings 9, 10 of 7, with the primary of the transformer 13 and with the adjustable resistance 43. Switch 26 makes it possible to shortcircuit the frequency converter over its commutator brushes and thus exclude it from the circuit of 7, and switch 44 does the same for the primary of transformer 13. A part of the secondary of 13 supplies energy to 14 and all of this secondary is in circuit with the secondary of 21, the adjustable resistance 30 and switch 23. The windings 16 and 17 of the phase converter are connected in series with each other and with the primary of 21. The converter starting windings 14, 18, 19 can be connected to the line by way of switch 34, transformer 33 and switch 32.

Fig. 3 is a part view of a synchronous motor with an auxiliary air-gap. The stator 42 carries the primary 5 which is not shown, the secondary is provided with a body 38 and distinct polar projections 39 having slots 41 located in the pole shoes thereof and very close to the rotor periphery. The distance piece 40 between the pole 39 and the body 38 is of non-magnetic material and magnetically separates 39 from 38 to form the auxiliary air-gap. The air-gap between 39 and 42 is reduced to the minimum determined by mechanical considerations. The polyphase winding 6 is located in the pole shoe slots 41 and the monoaxial winding 7 is disposed about the cores of the poles 39. In this manner the winding 6 is brought into the closest possible inductive relation to the primary without changing the reluctance of the magnetic path linking with 5 and 7.

It is to be understood that the frequency converter 27 of Figs. 1 or 2 can be replaced by an ordinary direct current generator driven in any desired manner and such a direct current generator can, if desired, be excluded from the circuit comprising 7 during the initial starting stages by means of the switch 26. Some of the improvements disclosed herein are particularly directed to facilitating synchronization by means of unidirectional current.

Transformers 13 and 21 are used mainly for the reason that the voltage generated in a winding such as 7 at starting is usually very high, higher than is desirable for use at the terminals of an auxiliary machine such as the phase converter 15.

Turning to the operation of the improved machine of Fig. 1, when used for instance as a synchronous three-phase motor, let all the switches be open. Upon closing 12 a flux is generated by 5 and revolves synchronously with respect to 5 and to all rotor windings so long as the rotor is at rest. A line frequency voltage therefore appears at the slip-rings 9, 10 and can be impressed on 13 and 14 by closing 36 and the secondary circuit of 13. The phase converter is started as a three-phase motor by closing switches 32 and 34. When up to speed switch 34 is opened and switches 36 and 13 closed, the machine continuing to operate as a single phase motor with 14 as primary. Phase displaced voltages are now available in 16 and 17, that in 17 is about cophasal with the voltage generated in 7 and that in 16 is about in phase quadrature to said generated voltage. These auxiliary voltages can be combined into an auxiliary phase correcting voltage of any desired phase and magnitude since the component voltages differ in phase by about 90 degrees and each of them is adjustable as to magnitude and direction. The resultant auxiliary phase correcting voltage is impressed on 21 and suitably transformed thereby if necessary. The starting circuit is closed at 23 and 30. The magnitude of the starting current and its phase relation with respect to the voltage generated in 7 by the revolving flux produced by 5 is now adjusted by means of 30, 21 and the movable contacts cooperating with 16 and 17, also by means of 13 if desired. If the adjustments are so made as to bring the total secondary starting current into phase, or nearly so, with the voltage generated in 7, the starting torque per ampere will be a maximum and the machine will start with a certain power factor in the primary. If the current in 7 leads or lags behind the generated voltage the torque per ampere will be less. A leading secondary current improves the power factor in the primary, a lagging current in the secondary makes the primary power factor worse. In making this statement it is arbitrarily assumed that a 90 degree leading power factor is best and a 90 degree lagging one is worst. As the secondary 7 gathers speed the frequency as well as the magnitude of the voltage is impressed on 14 diminishes. The auxiliary phase correcting voltage at the terminals of 21 diminishes with the frequency, just as the reactance of the winding 7 diminishes, and a nearly constant phase relation between current and generated voltage is therefore easily maintained in 7 over a wide range of speeds. The motor accelerates rapidly and soon reaches a speed where switch 8 can be closed without material shock to the system with the result that the machine is brought as near synchronism as the motor load and the impedance of 6 permit.

Since 6 is not used at starting it can be designed for a very low impedance with the result that it will develop a powerful induction motor torque at very small slips, particularly if the ohmic resistance of 6 is very low and the air-gap between 6 and the primary is reduced to the mechanically permissible minimum as shown in Fig. 3. The smaller the slip for a given torque developed by the secondary of the synchronous motor the easier can the machine be synchronized. When this slip is very small an amply sufficient synchronizing effort can be had for most practical purposes by producing an unidirectional magnetization on the secondary and without resort to a slip frequency magnetization for this purpose.

If it is desired to avoid passing the secondary starting current through the frequency converter, or other source of synchronizing voltage, switch 26 can be closed before switch 23 is closed.

The machine of Fig. 1 can be synchronized by opening switch 26, if closed, and closing switch 31. The position of the brushes 28, 29 on the commuted winding 27 determines the magnitude and configuration of the synchronizing torque as is now well understood. When synchronization is initiated after switch 8 is closed and 7 so dimensioned as to make the slip of the synchronous motor very small with 8 closed, then the machine can be synchronized with sufficient torque for most purposes by injecting an unidirectional instead of a slip frequency synchronizing voltage into 7.

According to a modified method of operation, synchronization may be initiated without closing switch 8, in such case a slip frequency synchronizing voltage will produce by far the better results when a powerful synchronizing torque is required. In practicing this modified method 6 may be dispensed with or 8 closed after synchronization. Switch 26 is opened, if closed, and switch 31 is closed but switch 36 is preferably not opened until the motor has reached synchronism so as to make use of the phase correcting property of the phase converter 15 as long as possible during the synchronizing action of the frequency converter 27.

The flywheel 20 is of use in a number of ways although not essential in all cases. The presence of this flywheel makes it unnecessary to close switch 36 and the circuit of 14 immediately after switch 34 has been opened after starting the auxiliary phase converter, the flywheel will keep this machine running long enough to allow of these operations being performed leisurely. Since a phase converter of the type shown converts at sub as well as at super-synchronous speeds without change of frequency, which is always determined by the frequency impressed on 14, the flywheel action causes the phase converter to boost the voltages in the starting circuit the more pronouncedly the quicker the acceleration of the synchronous motor and therefore the faster the fall in the frequency impressed on 14. This feature is particularly valuable when the phase converter is used during the synchronizing period.

The embodiment of Fig. 2 can be operated in a similar manner. Assuming all switches to be open, 32 and 34 are closed starting the phase converter 15 and its flywheel 20 and bringing it up to speed. Switch 34 can now be opened and 12 and 43 closed thus impressing a single phase voltage on the phase converter 13 and 14 and keeping 15 running. Switch 26 may be open or closed as desired. The synchronous motor can now be started by forming a starting circuit comprising the secondary of 13, the resistance 30 and the secondary of 21, and preferably so adjusting 16, 17 and 21 as to cause the current in 7 to about coincide in phase with the voltage generated in 7 by the revolving flux produced by 5. The so formed starting circuit includes the monoaxial winding 7 of the main motor inductively through transformer 13 and also includes the generating windings 16, 17 of the phase converter inductively through transformer 21. The like circuit of Fig. 1 includes 7 conductively and 16, 17 inductively. When the machine has reached a sufficient speed switch 8 can be closed and thereafter switch 26 opened and 31 closed. This will synchronize the motor effectively provided the brushes 28, 29 are properly positioned. Switch 44 can be closed after synchronization or at the time of closing 8, thus excluding the phase converter circuits from the circuit comprising 7. When the closing of 8 reduces the slip to a very small value then the phase converter can be excluded without considerable sacrifice.

As an alternative the winding 6 need not be used at all, or if used shortcircuited at synchronism or at a speed very near to synchronism. In such case synchronization can be initiated at a greater slip by opening 26 and closing 31 and the phase converter circuits will in this case markedly assist synchronization over a wide range of speeds by reducing the phase difference between the synchronizing currents and the voltage generated in 7. After synchronization switch 44 can be closed.

This machine, like the one shown in Fig. 1 can be very successfully synchronized by replacing 27 by an ordinary direct current exciter. To this end it is necessary to use winding 6 and to close switch 8 before injecting the direct current into the winding 7. If either machine is synchronized by means of the frequency converter the latter is automatically converted into a direct current generator at synchronism and provides the secondary unidirectional ampereturns necessary for the operation of the motor 5, 7 as a synchronous machine.

The arrangement of magnetic circuit and windings shown in Fig. 3 can be used in combination with the embodiment illustrated in Fig. 1 or with that shown in Fig. 2. By reducing the air-gap between the winding 6 and the primary 42 on which winding 5 is located the slip for a given ohmic resistance of 6 is reduced and synchronization made that much easier. The auxiliary air-gap 40 is dimensioned to raise the number of unidirectional ampereturns in the winding 7 to that which is necessary for a satisfactory operation at synchronous speed.

While theories have been advanced in connection with the machines referred to herein, this has been done with a view to facilitating their description and understanding, but it is to be understood that I do not bind myself to these or any other theories.

It is clear that various changes may be made in the details of this disclosure without departing from the spirit of this invention, and it is, therefore, to be understood that this invention is not to be limited to the specific details here shown and described. In the appended claims I aim to cover all the modifications which are within the scope of my invention.

What I claim is:

1. In a synchronous dynamo electric machine, a primary and a secondary member, pronounced polar projections on the secondary, an air-gap between the pronounced polar projections and the primary member, a winding located in the pronounced polar projections in closest proximity to said air-gap, and an auxiliary air-gap between a polar projection and the body of the secondary member.

2. In a synchronous dynamo electric machine, a primary and a secondary member, pronounced polar projections on the secondary, an air-gap between the pronounced polar projections and the primary member, a winding located in the pronounced polar projections in closest proximity to said air-gap, another winding surrounding the polar projections, and an auxiliary air-gap between a polar projection and the body of the secondary member.

3. In combination, an alternate current motor, a primary and a secondary, a monoaxial winding on the secondary in inductive relation to the primary, means for producing a flux which revolves synchronously with respect to the primary, means for closing the circuit of the monoaxial winding to start the motor, and means for injecting into the secondary starting circuit an auxiliary phase correcting voltage of slip frequency and of a magnitude which decreases proportionately with the slip of the alternate current motor.

4. In combination, an alternate current motor, a primary and a secondary, a monoaxial winding on the secondary in inductive relation to the primary, means for producing a flux which revolves synchronously with respect to the primary, means for closing the circuit of the monoaxial winding to start the motor, and means for injecting into the secondary starting circuit an auxiliary phase correcting voltage dependent on a voltage generated in a winding on said secondary.

5. In combination, an alternate current motor, a primary and a secondary, a monoaxial winding on the secondary in inductive relation to the primary, means for producing a flux which revolves synchronously with respect to the primary, means for closing the circuit of the monoaxial winding to start the motor, means for injecting into the secondary starting circuit an auxiliary phase correcting voltage dependent on a voltage generated in a winding on said secondary, and means for injecting a synchronizing voltage into the circuit of the monoaxial winding.

6. In combination, an alternate current motor, a primary and a secondary, a monoaxial winding on the secondary in inductive relation to the primary, means for producing a flux which revolves synchronously with respect to the primary, means for closing the circuit of the monoaxial winding to start the motor, means for injecting into the secondary starting circuit an auxiliary phase correcting voltage dependent on a voltage generated in a winding on said secondary, and means for adjusting the phase of the auxiliary phase correcting voltage.

7. In combination, an alternate current motor, a primary and a secondary, a monoaxial winding on the secondary in inductive relation to the primary, means for producing a flux which revolves synchronously with respect to the primary, means for closing the circuit of the monoaxial winding to start the motor, means for injecting into the secondary starting circuit an auxiliary phase correcting voltage dependent on a voltage generated in a winding on said secondary, and means for adjusting the magnitude of the auxiliary phase correcting voltage.

8. In combination, an alternate current motor, a primary and a secondary, a monoaxial winding on the secondary in inductive relation to the primary, means for producing a flux which revolves synchronously with respect to the primary, means for closing the circuit of the monoaxial winding to start the motor, means for injecting into the starting circuit on the secondary an auxiliary phase correcting voltage of slip frequency, another winding of low ohmic resistance on the secondary in inductive relation to the primary, and controllable means for shortcircuiting said other winding.

9. In combination, an alternate current motor, a primary and a secondary, a monoaxial winding on the secondary in inductive relation to the primary, means for producing a flux which revolves synchronously with respect to the primary, means for closing the circuit of the monoaxial winding to start the motor, a phase converter connected to receive energy from the secondary of the alternate current motor, a winding on the converter making available a voltage of slip frequency and of a phase differing from the phase of the voltage generated in the monoaxial winding by the revolving flux, and means for including said converter winding in circuit with the monoaxial winding.

10. In combination, a synchronous motor, a primary and a secondary, a monoaxial winding on the secondary in inductive relation to the primary, means for producing a flux which revolves synchronously with respect to the primary, means for closing the circuit of the monoaxial winding to start the motor, a phase converter connected to receive energy from the secondary of the synchronous motor, a winding on the converter making available a voltage of slip frequency and of a phase differing from the phase of the voltage generated in the monoaxial winding by the revolving flux, means for including said converter winding in circuit with the monoaxial winding, and means for imparting considerable inertia to the movable member of the phase converter.

11. In combination a synchronous motor, a primary and a secondary, a monoaxial winding on the secondary in inductive relation to the primary, means for producing a flux which revolves synchronously with respect to the primary, means for closing the circuit of the monoaxial winding to start the motor, a phase converter connected to receive energy from the secondary of the synchronous motor, a winding on the converter making available a voltage of slip frequency and of a phase differing from the phase of the voltage generated in the monoaxial winding by the revolving flux, means for including said converter winding in circuit with the monoaxial winding, and a frequency converter in circuit with the monoaxial winding and making available an auxiliary voltage of slip frequency and of a magnitude independent of its frequency.

12. In combination, a synchronous motor, a primary and a secondary, a monoaxial winding on the secondary in inductive relation to the primary, means for producing a flux which revolves synchronously with respect to the primary, means for closing the circuit of the monoaxial winding to start the motor, a phase converter connected to receive energy from the secondary of the synchronous motor, a winding on the converter making available a voltage of slip frequency and of a phase differing from the phase of the voltage generated in the monoaxial winding by the revolving flux, means for including said converter winding in circuit with the monoaxial winding, another winding on the secondary of the synchronous motor, and means for shortcircuiting said other winding.

13. In combination, a synchronous motor, a primary and a secondary, a monoaxial winding on the secondary in inductive relation to the primary, a phase converter having a motoring and a generating winding, means for impressing on the motoring winding of the phase converter a voltage generated in the monoaxial winding, a starting circuit for the synchronous motor comprising the monoaxial winding on the motor secondary and the generating winding on the phase converter, a source of synchronizing voltage, and means for including said source conductively in circuit with the monoaxial winding on the secondary of the synchronous motor.

14. In combination, a synchronous motor, a primary and a secondary, a monoaxial winding on the secondary in inductive relation to the primary, a transformer, a phase converter having a motoring and a generating winding, connections from the monoaxial winding to the primary of the transformer, connections including the secondary of said transformer for impressing on the motoring winding of the phase converter a voltage generated in the monoaxial winding, a starting circuit for the synchronous motor comprising the monoaxial winding on the motor secondary and the generating winding on the phase converter, a source of synchronizing voltage, means for including said source conductively in circuit with the monoaxial winding on the secondary of the synchronous motor, and means for short-circuiting the primary of the transformer.

15. In combination, a synchronous motor, a primary and a secondary, a monoaxial winding on the secondary in inductive relation to the primary, a phase converter having a motoring and a generating winding, means for impressing on the motoring winding of the phase converter a voltage generated in the monoaxial winding, a starting circuit for the synchronous motor comprising the monoaxial winding on the motor secondary and the generating winding on the phase converter, a source of synchronizing voltage, means for including said source conductively in circuit with the monoaxial winding on the secondary of the synchronous motor, another winding on the secondary of the synchronous motor, and controllable means for shortcircuiting said other winding.

16. In combination, a synchronous motor, a primary and a secondary, a monoaxial winding on the secondary in inductive relation to the primary, means for producing a flux which revolves synchronously with respect to the primary, a transformer, a phase converter having a motoring and a generating winding, connections from the monoaxial winding to the primary of the transformer, means for impressing on the motoring winding of the phase converter a voltage generated in the monoaxial winding, and a circuit comprising the secondary of said transformer and the generating winding on the phase converter.

17. In combination, a synchronous motor, a primary and a secondary, a monoaxial winding on the secondary in inductive relation to the primary, means for producing a flux which revolves synchronously with respect to the primary, a transformer, a phase converter having a motoring and a generating winding, connections from the monoaxial winding to the primary of the transformer, means for impressing on the motoring winding of the phase converter a voltage generated in the monoaxial winding, a circuit comprising the secondary of said transformer and the generating winding on the phase converter, and a source of synchronizing voltage in circuit with the primary of said transformer and with the monoaxial winding on the secondary of the synchronous motor.

18. In combination, an alternate current motor, a primary and a secondary, a winding on the secondary in inductive relation to the primary, a dynamo electric machine mechanically independent from the alternate current motor as to relative speed of its two members and connected to receive energy from the winding on the secondary, and a flywheel cooperating with one element of said dynamo electric machine.

19. The method of operating a synchronous motor, comprising, producing a flux which revolves synchronously with respect to the primary, producing at standstill and at low motor speeds a monoaxial slip frequency magnetization on the secondary of a phase adapted to start the motor in cooperation with the synchronously revolving flux, producing a polyaxial slip frequency magnetization on the secondary at higher motor speeds, and finally producing a monoaxial and unidirectional magnetization on the secondary to synchronize the motor.

20. The method of operating a synchronous motor having a primary and a monoaxial and a polyaxial winding on the secondary, comprising, producing a flux which revolves synchronously with respect to the primary, closing the monoaxial winding on the secondary, neutralizing or compensating for at least part of the inductance of the monoaxial winding to cause the current therein to develop a preponderantly positive starting torque in cooperation with the revolving flux, short-circuiting the polyaxial winding after the motor has reached a sufficient speed, and finally injecting a synchronizing voltage into the monoaxial winding.

In testimony whereof I affix my signature this 16th day of January, 1928.

VALÈRE A. FYNN.